United States Patent
Yamaji et al.

(10) Patent No.: US 7,471,939 B2
(45) Date of Patent: Dec. 30, 2008

(54) MULTIPLIER AND RADIO COMMUNICATION APPARATUS USING THE SAME

(75) Inventors: Takafumi Yamaji, Yokohama (JP); Hidenori Okuni, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 503 days.

(21) Appl. No.: 11/386,658

(22) Filed: Mar. 22, 2006

(65) Prior Publication Data

US 2007/0026835 A1  Feb. 1, 2007

(30) Foreign Application Priority Data

Aug. 1, 2005  (JP)  ............... 2005-222770

(51) Int. Cl.
    *H04B 1/26* (2006.01)
(52) U.S. Cl. .................. 455/313; 455/323; 455/333
(58) Field of Classification Search ............... None
    See application file for complete search history.

(56) References Cited

U.S. PATENT DOCUMENTS

| | | | |
|---|---|---|---|
| 5,311,086 A | | 5/1994 | Yamaji et al. |
| 5,483,695 A | * | 1/1996 | Pardoen ............ 455/314 |
| 5,548,839 A | * | 8/1996 | Caldwell et al. ...... 455/313 |
| 7,414,468 B2 | | 8/2008 | Yamaji et al. |
| 2003/0119474 A1 | * | 6/2003 | Kimura ............. 455/333 |

FOREIGN PATENT DOCUMENTS

| | | |
|---|---|---|
| JP | 2001-339989 | 12/2001 |
| JP | 3360912 | 10/2002 |

OTHER PUBLICATIONS

Yamaji, Takafumi, Vector Pulse-Density Modulation, IEE Electronic Letters, vol. 30, No. 20, pp. 1652-1653, Sep. 29, 1994.

* cited by examiner

*Primary Examiner*—Thanh C Le
(74) *Attorney, Agent, or Firm*—Amin, Turocy & Calvin, LLP (57) ABSTRACT

A multiplier includes a first input terminal which receives a modulated signal, three second input terminals which receive first, second, and third local signals respectively, the first, second, and third local signals having a phase difference of 120° from one another, a multiplication unit configured to multiply the modulated signal by each of the first, second, and third local signals, and output first, second, and third multiplied output signals, and three output terminals from which the first, second, and third multiplied output signals are derived, respectively.

17 Claims, 7 Drawing Sheets

MULTIPLIER AND RADIO COMMUNICATION APPARATUS USING THE SAME

CROSS-REFERENCE TO RELATED APPLICATIONS

This application is based upon and claims the benefit of priority from prior Japanese Patent Application No. 2005-222770, filed Aug. 1, 2005, the entire contents of which are incorporated herein by reference.

BACKGROUND OF THE INVENTION

1. Field of the Invention

The present invention relates to a multiplier and a radio communication apparatus using the multiplier.

2. Description of the Related Art

In the radio communication field as of 2005, there are adopted many systems for modulating a signal to be transmitted with respect to both the amplitude and phase of the signal. Therefore, in general, a quadrature modulator is used in a transmitter, and a quadrature demodulator is used in a receiver.

In a general quadrature modulator, as described in, for example, Jpn. Pat. No. 3360912, two multipliers multiply two modulating signals called an in-phase signal (referred to as the I-signal) and a quadrature-phase signal (referred to as the Q-signal) and two local signals having a phase difference of 90° from each other. Multiplied output signals from the multipliers are combined, and a modulated signal is generated. Assuming that the I-signal is I(t), the Q-signal is Q(t), and two local signals are cos ωt and Sin ωt, the modulated signal output from the quadrature modulator is represented by the following formula:

$$I(t)\cos \omega t + Q(t)\sin \omega t \qquad (1)$$

On the other hand, the quadrature demodulator performs processing reverse to that of the quadrature modulator. That is, in a general quadrature demodulator, as described in, for example, Jpn. Pat. No. 3545615, two multipliers multiply the modulated signal represented by Formula (1) by two local signals having a phase difference of 90° from each other. As a result, a multiplied output signal represented by the following equation is obtained from each multiplier:

$$\cos\omega t(I(t)\cos\omega t + Q(t)\sin\omega t) = I(t)\frac{1+\cos 2\omega t}{2} + Q(t)\frac{\sin 2\omega t}{2}; \qquad (2)$$

and $$\sin\omega t(I(t)\cos\omega t + Q(t)\sin\omega t) = I(t)\frac{\sin 2\omega t}{2} + Q(t)\frac{1-\cos 2\omega t}{2} \qquad (3)$$

After passing the multiplied output signal of each multiplier through a low-pass filter to remove a high-frequency component, the signal is amplified with an appropriate gain to obtain an original I-signal I(t) and Q-signal Q(t).

In actual quadrature modulator and quadrature demodulator, a double balanced mixer is generally used in the multiplier so as to reduce undesired signals included in an output. In this case, in a baseband signal, a differential type is used in which a positive signal and a negative signal are combined.

In the conventional quadrature modulator and quadrature demodulator, differential circuits corresponding to the I-signal and the Q-signal need to be used, respectively, in order to avoid an output of an undesired signal. This increases the number of analog elements such as transistors, resistors, and capacitors required for the quadrature modulator and the quadrature demodulator. As a result, in a case where a radio communication apparatus is integrated on a semiconductor circuit, an area occupied by the quadrature modulator and the quadrature demodulator on a semiconductor chip increases. With the progress of a semiconductor fine working technology, a cost of the semiconductor chip per unit area is on the rise. In consideration of this, it is an important issue to reduce occupying areas of individual functional elements such as the quadrature modulator and the quadrature demodulator.

Moreover, since the multipliers corresponding to the I-signal and the Q-signal are used in the conventional quadrature modulator and quadrature demodulator, an I-signal gain does not necessarily meet a Q-signal gain. Therefore, a modulation error or a demodulation error is generated causing a communication quality to deteriorate.

BRIEF SUMMARY OF THE INVENTION

According to an aspect of the present invention, there is provided a multiplier comprising: a first input terminal which receives a modulated signal; three second input terminals which receive first, second, and third local signals respectively, the first, second, and third local signals having a phase difference of 120° from one another; a multiplication unit configured to multiply the modulated signal by each of the first, second, and third local signals, and output first, second, and third multiplied output signals; and three output terminals from which the first, second, and third multiplied output signals are derived, respectively.

DETAILED DESCRIPTION OF THE INVENTION

Several embodiments of the present invention will be described hereinafter in detail with reference to the drawings. It should be noted that since a multiplier can handle a vector signal, that is, a signal including information of both amplitude and phase in the embodiment of the present invention, the multiplier will be hereinafter referred to as the vector multiplier.

FIRST EMBODIMENT

Figure 1:
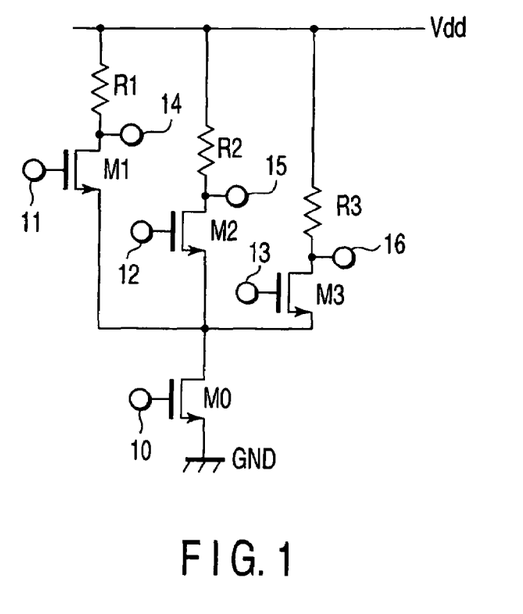
FIG. 1 is a circuit diagram of a vector multiplier in a first embodiment of the present invention.

FIG. 1 shows a vector multiplier in a first embodiment of the present invention. This vector multiplier has an RF input terminal 10; LO input terminals 11, 12, and 13; N-type MOS (NMOS) transistors M0, M1, M2, and M3; load resistors R1, R2, and R3; and output terminals 14, 15, and 16. A multiplication unit includes the transistors M0, M1, M2, and M3 and the load resistors R1, R2, and R3.

The RF input terminal 10 is connected to a gate terminal of the transistor M0. A source terminal of the transistor M0 is connected to the ground GND. The LO input terminals 11, 12, and 13 are connected to gate terminals of the transistors M1, M2, and M3, respectively. Drain terminals of the transistors M1, M2, and M3 are connected to the output terminals 14, 15, and 16, respectively. Furthermore, the drain terminals of the transistors M1, M2, and M3 are connected to a power supply Vdd via the load resistors R1, R2, and R3, respectively. Common source terminals of the transistors M1, M2, and M3 are connected to the drain terminal of the transistor M0.

A voltage signal (referred to as the RF signal) of a radio frequency (RF) band, whose amplitude or phase has been modulated, is input to the RF input terminal 10. The RF signal is converted into a current signal by the transistor M1. Three local signals (hereinafter referred to as the three-phase local signals) having a phase difference of 120° are input to the LO input terminals 11, 12, and 13, respectively. The three-phase local signals may be either sinusoidal signals or square-wave signals having a duty ratio of 1/3.

In a case where the vector multiplier of FIG. 1 is used as a demodulator, a modulated signal represented by the following formula is input as an RF signal into the RF input terminal 10;

$$I(t)\cos \omega t + Q(t)\sin \omega t \quad (4)$$

where I(t) denotes an in-phase signal (I-signal), and Q(t) denotes a quadrature-phase signal (Q-signal).

On the other hand, three-phase local signals represented by the following formula are input to the local input terminals 11, 12, and 13, respectively, $$\left.\begin{array}{l}\cos\omega t \\ \cos\left(\omega t + \frac{2}{3}\pi\right) = \cos\omega t \cos\frac{2}{3}\pi - \sin\omega t \sin\frac{2}{3}\pi \\ \cos\left(\omega t - \frac{2}{3}\pi\right) = \cos\omega t \cos\frac{2}{3}\pi + \sin\omega t \sin\frac{2}{3}\pi\end{array}\right\} \quad (5)$$

The vector multiplier of FIG. 1 multiplies the modulated signal of Formula (4) by the three-phase local signals of Formula (5). At this time, local frequency components of multiplied output signals derived from the output terminals 14, 15, and 16 are represented by the following formula:

$$\left.\begin{array}{l}\frac{I(t)}{2} \\ \frac{-I(t)}{4} - \frac{\sqrt{3}\,Q(t)}{4} \\ \frac{-I(t)}{4} + \frac{\sqrt{3}\,Q(t)}{4}\end{array}\right\} \quad (6)$$

Formula (6) indicates that the multiplied output signal from the output terminal 14 is passed through the low-pass filter to generate an I-signal I(t). As to a Q-signal Q(t), after the multiplied output signals from the output terminals 15 and 16 are passed through the low-pass filter, a processor constituted of an analog or digital circuit performs the following calculation to generate the signal:

$$\left(\frac{-I(t)}{4} + \frac{\sqrt{3}\,Q(t)}{4}\right) - \left(\frac{-I(t)}{4} - \frac{\sqrt{3}\,Q(t)}{4}\right) = \frac{\sqrt{3}\,Q(t)}{2} \quad (7)$$

Figure 2:
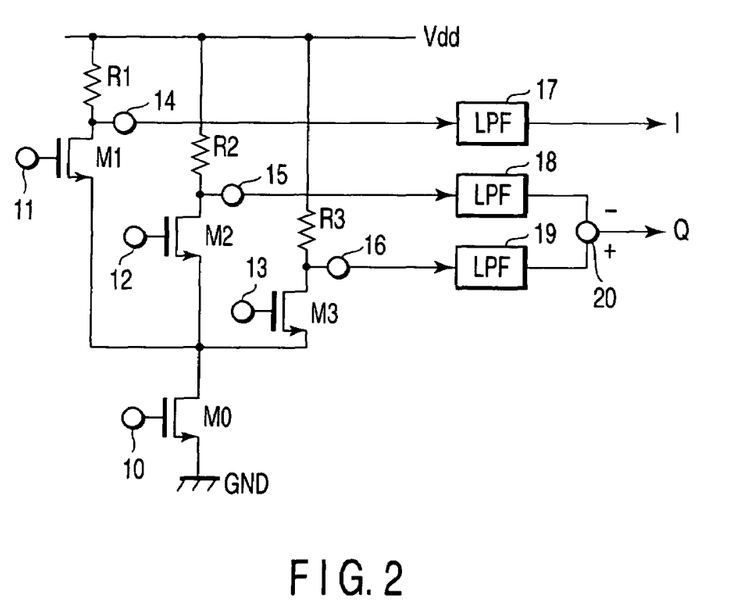
FIG. 2 is a circuit diagram of a demodulator including the vector multiplier of FIG. 1.

FIG. 2 shows an example of a demodulator in which the vector multiplier of FIG. 1 is used. As shown in FIG. 2, output terminals 14, 15, and 16 of the vector multiplier are connected to inputs of low-pass filters 17, 18, and 19. An I-signal is extracted from an output of the low-pass filter 17. Outputs of the low-pass filters 18 and 19 are connected to a processor (subtracter in this example) 20, and a Q-signal is extracted from an output of the subtracter 20.

In the conventional quadrature demodulator, the multipliers are used for I- and Q-channels, respectively. On the other hand, the vector multiplier of the present embodiment has three local input terminals 11, 12, and 13 and three output terminals 21, 22, and 23. Therefore, a vector multiplier can generate a signal having complex-number information, that is, the I-signal and the Q-signal. Moreover, the conventional quadrature demodulator requires a circuit which distributes the input modulated signal into the multipliers for the I-channel and the Q-channel. On the other hand, the vector multiplier of the present embodiment does not require such distribution circuit. This indicates that an area occupied by the multiplier of the present embodiment on a semiconductor chip is reduced, and the demodulator can be realized all the more inexpensively.

Furthermore, since there are fewer error factors such as a difference between an I-signal gain and a Q-signal gain in the vector multiplier of the present embodiment as compared with a case where the multipliers are used for the I-channel and the Q-channel, respectively, a demodulation precision is easily secured.

As described above, according to the embodiment of the present invention, when the three-phase local signals having a phase difference of 120° are used, a single multiplier can handle the complex-number signal (I-signal and Q-signal). Therefore, in a case where the demodulator or the modulator of the radio communication apparatus is realized using the multiplier, the number of the circuit element can be reduced, and the occupied area on the semiconductor chip can be saved. Therefore, cost reduction becomes possible. Since the multiplier of the embodiment of the present invention is common to the I-signal and the Q-signal, the I-signal gain agrees with the Q-signal gain, and there are fewer error factors. Therefore, demodulation and modulation precisions are easily secured.

SECOND EMBODIMENT

Figure 3:
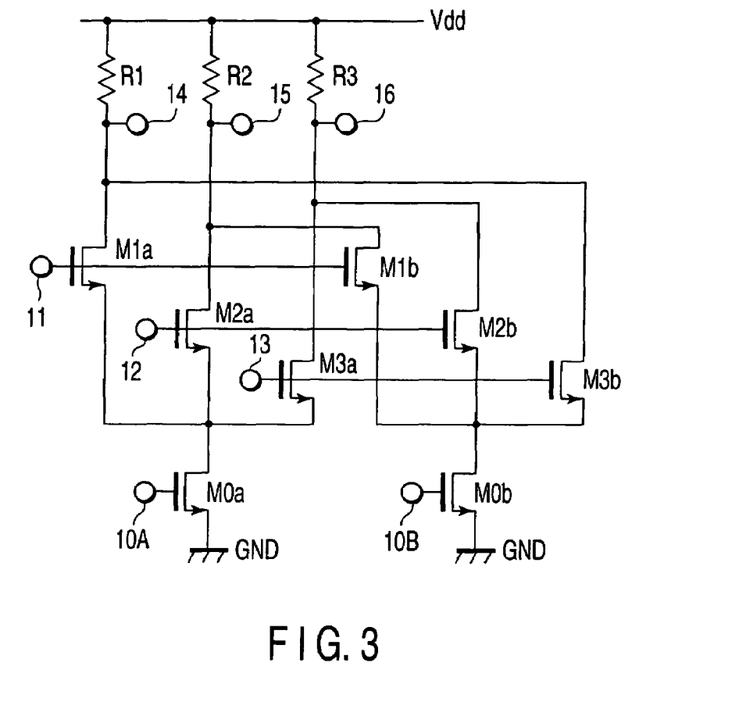
FIG. 3 is a circuit diagram of a vector multiplier in a second embodiment of the present invention.

FIG. 3 shows a vector multiplier in a second embodiment of the present invention for an input of differential RF signal (modulated signal). A multiplier unit includes transistors M0a, M0b, M1a, M1b, M2a, M2b, M3a, and M3b, and load resistors R1, R2, and R3. RF input terminals 10A and 10B are connected to gate terminals of the transistors M0a and M0b. Source terminals of the transistors M0a and M0b are both connected to the ground GND. Gate terminals of the transistors M1a and M1b are connected to an input terminal 11 in common. Gate terminals of the transistors M2a and M2b are connected to an input terminal 12 in common. Gate terminals of the transistors M3a and M3b are connected to an input terminal 13 in common.

Drain terminals of the transistors M1a and M3b are connected to an output terminal 14 in common. The drain terminals of the transistors M1a and M3b are further connected to a power supply Vdd via the common load resistor R1. Drain terminals of the transistors M2a and M1b are connected to an output terminal 15. The drain terminals of the transistors M2a and M1b are further connected to the power supply Vdd via the common load resistor R2. Drain terminals of the transistors M3a and M2b are connected to an output terminal 16. The drain terminals of the transistors M3a and M2b are further connected to the power supply Vdd via the common load resistor R3. A common source terminal of the transistors M1a, M2a, and M3a is connected to a drain terminal of the transistor M0a. A common source terminal of the transistors M1b, M2b, and M3b is connected to the drain terminal of the transistor M0b.

First and second polarity signals of the differential RF signal are input to the RF input terminals 10A and 10B. The first and second polarity signals are converted into current signals by the transistors M0a and M0b, respectively. The current signals flowing through the transistors M0a, M0b are switched by the three-phase local signals input to the local input terminals 11, 12, and 13 and having a phase difference of 120°, and thereby frequency-converted. In the three-phase local signals, square-wave signals having a duty ratio of 1/3 are used. Therefore, potentials of the local input terminals 11, 12, and 13 successively change with an elapse of time.

Here, the transistors M1a and M1b turn on in a period in which the potential of the input terminal 11 is high. Therefore, output signals are output as differential signals from the output terminals 14 and 15 connected to the transistors M1a and M1b. Similarly, the transistors M2a and M2b turn on in a period in which the potential of the local input terminal 12 is high. Therefore, output signals are output as differential signals from the output terminals 15 and 16. The transistors M3a and M3b turn on in a period in which the potential of the local input terminal 13 is high. Therefore, output signals are output as differential signals from the output terminals 14 and 16.

As described above, while the output terminals to output the differential output signals are switched by the three-phase local signals, demodulation is performed. The vector multiplier shown in FIG. 1 outputs a single end signal from one terminal switched among three output terminals. On the other hand, in FIG. 2, the vector multiplier outputs the differential signals from two of the three output terminals.

<Three-Phase Local Signal Generator>

Figure 4:
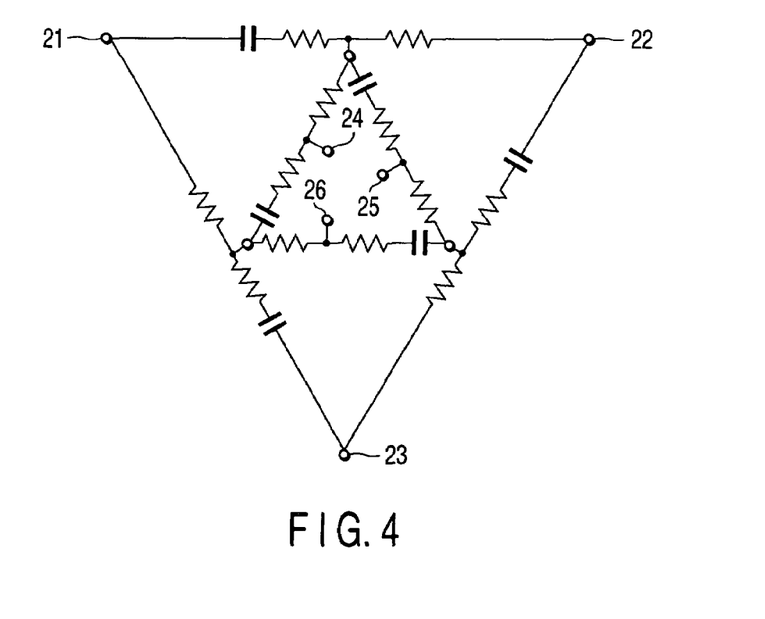
FIG. 4 is a circuit diagram of a two-phase to three-phase polyphase filter, which is an example of a three-phase local signal generator.

Next, a three-phase local signal generator will be described. FIG. 4 shows an example of a three-phase polyphase filter, which converts the differential input signals into the three-phase local signals having a phase difference of 120°. In the conventional quadrature demodulator, a four-phase polyphase filter is used in generation of the local signals. The four-phase polyphase filter converts the differential input signals into four-phase local signals having a phase difference of 90°. The local signal of each phase of the four-phase local signals is generated by a series circuit including a resistor and a capacitor, and derived from a connection point between the resistor and the capacitor. On the other hand, instead of the capacitor in the four-phase polyphase filter, as shown in FIG. 4, the series circuit including the resistor and the capacitor is used in the generation of the three-phase local signals having a phase difference of 120°.

In FIG. 4, original local signals of differential signals from a local oscillator (not shown) are input between input terminals 21 and 23 and between input terminals 22 and 23. The input original local signals are supplied to opposite ends of each of three series circuits in a first stage. Each of the series circuit includes two resistors and one capacitor. Signals having a phase difference of 120° are output from the connection point between two resistors of each series circuit. The signals output from the three series circuits of the first stage are further supplied to opposite ends of each of three series circuits in a second stage. Similarly, each second-stage series circuit includes two resistors and one capacitor, and local signals having a phase difference of 120° are output from connection points 24, 25, and 26 between two resistors, respectively. FIG. 4 shows an example of the two-stage polyphase circuit, and a frequency region having less errors can be enlarged by multistage connection in the same manner as in the four-phase polyphase filter.

When the polyphase filter is used in this manner, it is possible to easily generate three-phase local signals by use of the existing single-phase local oscillator.

Figure 5:
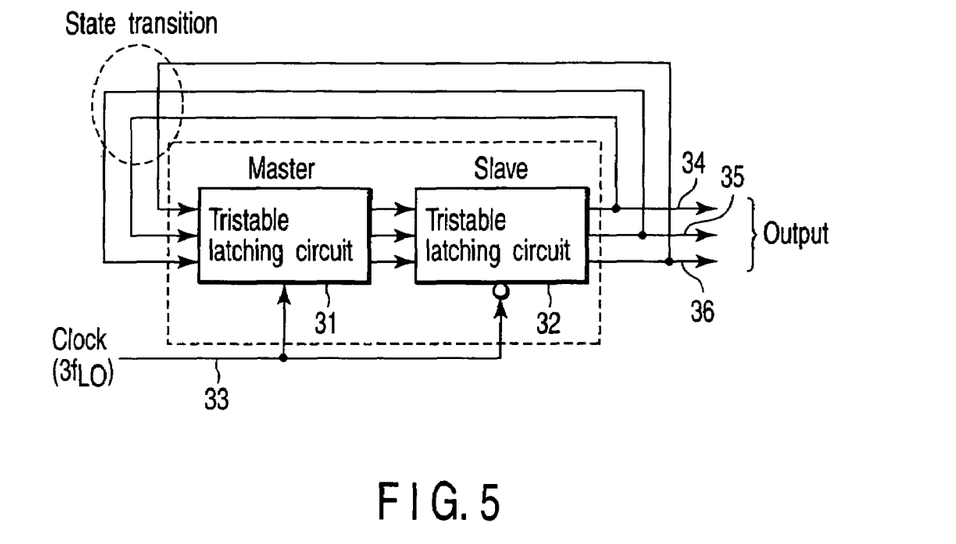
FIG. 5 is a block diagram of a three-frequency divider, which is another example of the three-phase local signal generator.

FIG. 5 shows a three-frequency divider as another example of the three-phase local signal generator. In general, a binary counter is used in a conventional n-frequency divider. The counter counts original clock signals. An output value of the counter is compared with a frequency dividing ratio n. The counter is reset in a case where an output value of the counter is larger than n. This realizes n-frequency division. To generate local signals to be applied to a quadrature modulator/demodulator, the signals having a phase difference of 90°, the local signal generator is realized by a two-frequency or four-frequency divider. In the two-frequency or four-frequency divider, the divider can be reset itself using a repetition period of the binary counter in a case where the output value of the counter is larger than n (2 or 4). This obviates a necessity for a comparator for generating a reset pulse.

On the other hand, the three-frequency divider is required for generating the three-phase local signals by use of the frequency divider. In this case, the reset pulse needs to be generated using the comparator, which compares the output of the counter with the frequency division ratio. When the reset pulse is used, an error corresponding to a width (time required for resetting the counter) of the reset pulse is generated in the pulse width of the three-phase local signals. To generate three signals such as the three-phase local signals obtained by dividing a time axis into three equal portions, mechanisms for generating three signals are preferably the same.

In the frequency divider of FIG. 5, two tri-stable latching circuits 31 and 32 are used instead of a bi-stable latching circuit, which is often utilized in a digital circuit. In the bi-stable latching circuit, one of two outputs indicates a high or low level. On the other hand, in the tri-stable latching circuit, only one of three outputs indicates a high level, and two outputs indicate a low level. Alternatively, only one output indicates a low level, and two outputs indicate a high level.

An operation is performed while the tri-stable latching circuit 31 is disposed on a master side, and the tri-stable latching circuit 32 is disposed on a slave side. The tri-stable latching circuits 31 and 32 are annularly connected to each other. That is, three outputs of the tri-stable latching circuit 31 on the master side are applied to three inputs of the tri-stable latching circuit 32 on the slave side. Three outputs of the tri-stable latching circuit 32 on the slave side are applied to three inputs of the tri-stable latching circuit 31 on the master side. The three-phase local signals are output from three outputs of the tri-stable latching circuit 32 on the slave side.

The tri-stable latching circuits 31 and 32 perform an operation, when there is supplied a clock signal 33 having a frequency, which is three times a local signal frequency $f_{LO}$. When the clock signal 33 changes from the high level to the low level, a state of the tri-stable latching circuit 31 on the master side is copied to the tri-stable latching circuit 32 on the slave side. Conversely, when the clock signal 33 changes from the low level to the high level, a state of the tri-stable latching circuit 32 on the slave side is copied to the tri-stable latching circuit 31 on the master side.

Here, when three outputs of the tri-stable latching circuit 32 on the slave side are displaced by one to feed the outputs back to three inputs of the tri-stable latching circuit 31 on the master side as shown in FIG. 5, the state can undergo a transition. Three inputs of each of the tri-stable latching circuits 31 and 32 are a first input, a second input, and a third input from above in the drawing. Three outputs of each of the tri-stable latching circuits 31 and 32 are a first output, a second output, and a third output from above in the drawing. At this time, the first output, the second output, and the third output of the tri-stable latching circuit 31 are supplied to the first input, the second input, and the third input of the tri-stable latching circuit 32, respectively. On the other hand, the first output, the second output, and the third output of the tri-stable latching circuit 32 are supplied to the second input, the first input, and the third input of the tri-stable latching circuit 31, respectively.

In this case, each of the tri-stable latching circuits 31 and 32 undergoes a state transition every period of the clock signal 33, and three states repeatedly transit. As a result, three-phase clock signals obtained by dividing the clock signal 33 into three frequencies are obtained as outputs of the tri-stable latching circuit 32.

When the three-phase local signal generator is constituted using the three-frequency divider in this manner, it is possible to enlarge the frequency region of the three-phase local signals having less phase errors as compared with a case where a filter such as the polyphase filter is used.

Figure 6:
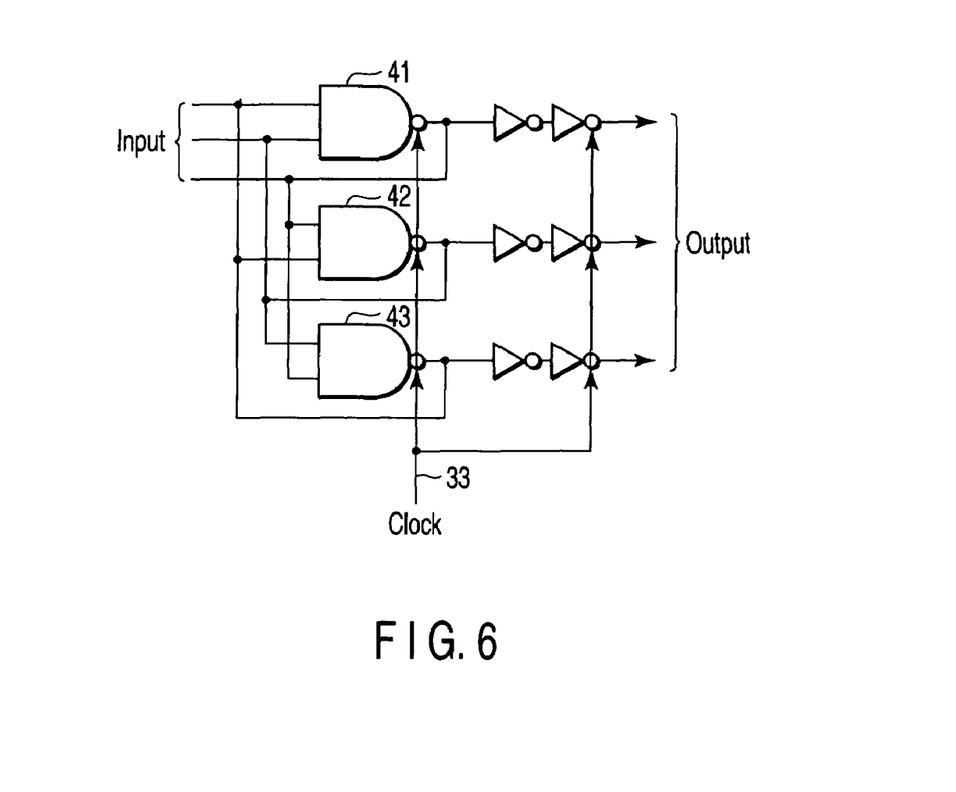
FIG. 6 is a circuit diagram of a tristable latching circuit shown in FIG. 5.

FIG. 6 is a circuit diagram showing an example of a tristable latching circuit. This is an example of the tri-stable latching circuit of a NAND type. As NAND circuits 41, 42, and 43, there are used clocked NAND circuits whose output indicates high impedance at a time when the clock signal has a low level. Outputs of two other NAND circuits are supplied to the inputs of the NAND circuits 41, 42, and 43. As an output buffer, there is used a circuit in which a usual inverter is combined with a clocked inverter controlled by the clock signal 33. When the NAND circuits 41, 42, and 43 are combined as shown in FIG. 6, the tri-stable latching circuit is brought into a stable state only in a case where only one of three outputs indicates the low level. Conversely, only one output indicates the high level in a case where a NOR circuit is used instead of the NAND circuit. Either a NAND or NOR circuit is usable in the three-frequency divider. It is also possible to combine NAND and NOR. In this case, one inverter may be omitted from an output buffer of FIG. 6.

In FIG. 5, the three-frequency divider has been described, but it can be easily presumed that the frequency divider can be expanded to a frequency divider having three or more odd-numbered frequency-dividing ratios. That is, there are used a first odd-numbered stable latching circuit and a second odd-numbered stable latching circuit having three or more odd-numbered stable states and constituted so that the stable state cyclically transits every cycle of the input reference clock signal. This can realize the frequency divider having three or more odd-numbered frequency dividing ratios.

THIRD EMBODIMENT

Figure 7:
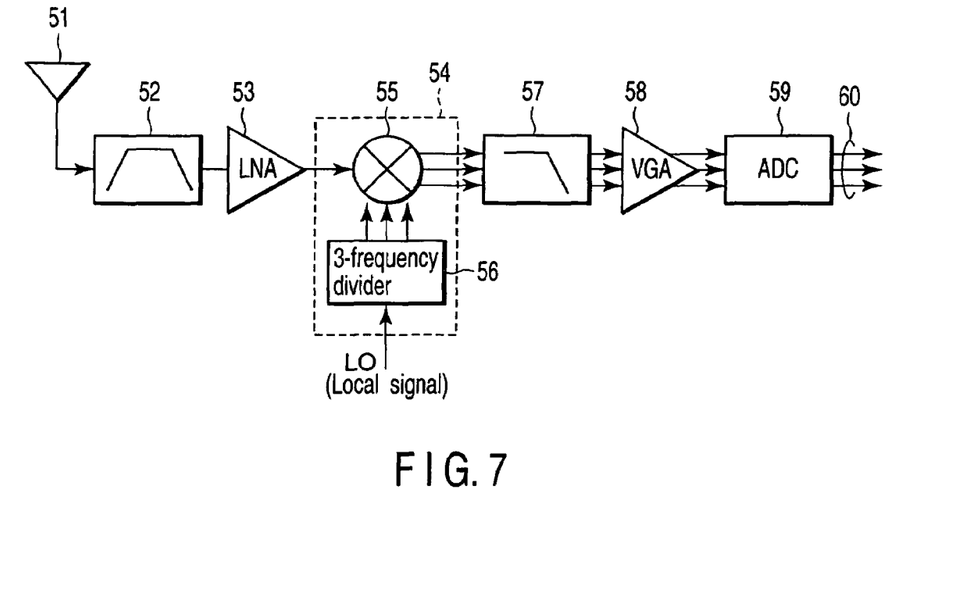
FIG. 7 is a block diagram of a reception side (radio receiver) of the radio communication apparatus in a third embodiment of the present invention.

FIG. 7 is a block diagram of a reception side (radio receiver) of a radio communication apparatus in a third embodiment of the present invention. This radio receiver includes a demodulator realized using a vector multiplier. A reception signal output from an antenna 51, which receives an RF signal, is input to a low-noise amplifier 53, after a high-frequency filter 52 roughly selects a channel. An output signal of the low-noise amplifier 53 is input to a demodulator 54.

The demodulator 54 has a vector multiplier 55 shown in, for example, FIG. 1 or 3; and a three-frequency divider 56 shown in FIG. 5. A local signal whose frequency is three times a reception signal frequency is input as the clock signal 33 shown in FIG. 5 to the three-frequency divider 56 of the demodulator 54. Three-phase baseband signals around a direct current appear as output signals from the demodulator 54. A necessary frequency component is selectively extracted from the output signals of the demodulator 54 by a baseband filter 57 in the same manner as in a usual direct conversion receiver. After output signals of the baseband filter 57 are amplified into signals having amplitude suitable for analog-to-digital conversion by a variable gain amplifier 58, the signals are input to an analog-to-digital converter 59. The analog-to-digital converter 59 outputs three-phase digital baseband signals. After the three-phase digital baseband signals are converted into usual I and Q two-phase digital baseband signals, the signals are sent to a baseband processing unit (not shown), and decoded.

A conventional direct conversion receiver handles an I-signal and a Q-signal as differential signals, respectively, whereas the receiver of FIG. 7 handles the I-signal and the Q-signal together as one set of three-phase signals. In the conventional direct conversion receiver, four signal lines are required for transmission of the I-signal and the Q-signal. On the other hand, necessary signal lines are reduced to three lines in the radio receiver of FIG. 7. With the decrease of the necessary signal lines, elements necessary for the circuit are also reduced. For example, elements required for the baseband filter 57, the variable gain amplifier 58, and the analog-to-digital converter 59 are reduced to ¾ elements by simple calculation.

As described above, the demodulator 54 using the vector multiplier includes less elements as compared with the conventional quadrature demodulator. Therefore, the demodulator can be realized by a small occupying area on a semiconductor chip. Further in the radio receiver of FIG. 7, as described above, it is possible to reduce the number of the elements of the baseband filter 57, the variable gain amplifier 58, and the analog-to-digital converter 59 disposed after the demodulator 54. Therefore, the receiver can be integrated on the semiconductor chip having a smaller area. Needless to say, the area reduction of the semiconductor chip can reduce manufacturing costs of the radio communication apparatus.

FOURTH EMBODIMENT

Figure 8:
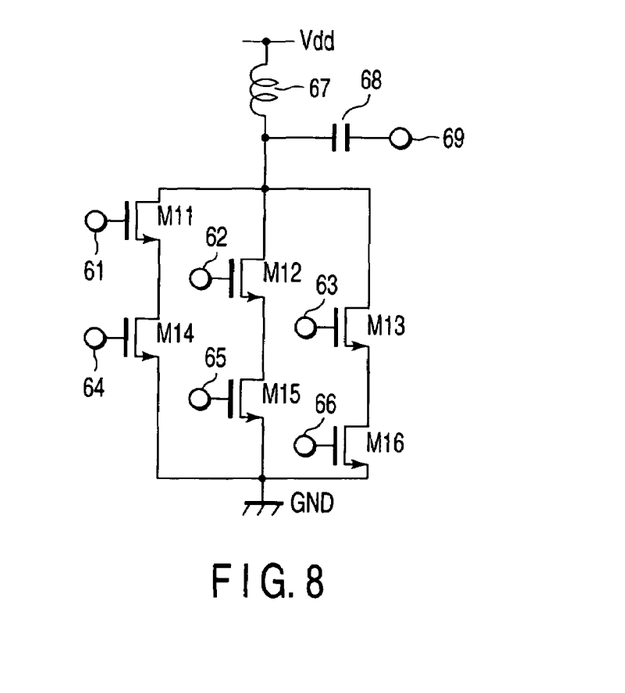
FIG. 8 is a circuit diagram of a vector multiplier in a fourth embodiment of the present invention.

FIG. 8 shows a vector multiplier in a fourth embodiment of the present invention. This vector multiplier has: modulation input terminals 61, 62, and 63; LO input terminals 64, 65, and 66; NMOS transistors M11, M12, M13, M14, M15, and M16; an inductor 67; a capacitor 68; and an output terminal 69. The inductor 67 and the capacitor 68 form a load circuit. A multiplication unit is constituted of the transistors M11, M12, M13, M14, M15, and M16 and the load circuit.

The modulation input terminals 61, 62, and 63 are connected to gate terminals of the transistors M11, M12, and M13, respectively. The local input terminals 64, 65, and 66 are connected to gate terminals of the transistors M14, M15, and M16, respectively. The transistor M11 is cascade-connected to the transistor M14. The transistor M12 is similarly cascade-connected to the transistor M15, and the transistor M13 is cascade-connected to the transistor M16. Drain terminals of the transistors M11, M12, and M13 are connected to the load circuit in common, and source terminals of the transistors M14, M15, and M16 are connected to the ground GND. The output terminal 69 is connected to a common connection point between the drain terminals of the transistors M11, M12, and M13 and the load circuit.

Modulating signals of voltage signals are input to the modulation input terminals 61, 62, and 63. The modulating signal is converted into a current signal by the transistor M1. Three-phase local signals having a phase difference of 120° are input to the LO input terminals 11, 12, and 13, respectively. The three-phase local signals may be either sinusoidal signals or square-wave signals having a duty ratio of 1/3.

In a case where the vector multiplier of FIG. 8 is used as a modulator, the modulating signals represented by the following equation are input to the modulation input terminals 61, 62, and 63.

$$\left.\begin{array}{c} I(t) \\ \dfrac{-I(t)}{2} - \dfrac{\sqrt{3}\,Q(t)}{2} \\ \dfrac{-I(t)}{2} + \dfrac{\sqrt{3}\,Q(t)}{2} \end{array}\right\} \quad (8)$$

The transistors M11, M12, and M13 generate current signals controlled by the modulating signals of Equation (8).

On the other hand, the three-phase local signals represented by the following equation and having a phase difference of 120° are input to the local input terminals 64, 65, and 66, respectively. The three-phase local signals may be either sinusoidal signals or square-wave signals having a duty ratio of 1/3.

$$\left.\begin{array}{c} \cos\omega t \\ \cos\left(\omega t + \dfrac{2}{3}\pi\right) = \cos\omega t \cos\dfrac{2}{3}\pi - \sin\omega t \sin\dfrac{2}{3}\pi \\ \cos\left(\omega t - \dfrac{2}{3}\pi\right) = \cos\omega t \cos\dfrac{2}{3}\pi + \sin\omega t \sin\dfrac{2}{3}\pi \end{array}\right\} \quad (9)$$

The transistors M14, M15, and M16 are controlled by three-phase local signals of Formula (9), respectively. In the load circuit constituted of the inductor 67 and the capacitor 68, there is added a current signal as a product of the quadrature modulating signal of Formula (8) input to the modulation input terminals 61, 62, and 63, respectively, and the three-phase local signals of Formula (9) input to the local input terminals 64, 65, and 66, respectively. Therefore, in the output terminal 69 of the load circuit, there is obtained a modulated signal which includes an I-signal I(t) and a Q-signal Q(t) and whose amplitude and phase have been modulated and which are represented by the following formula in the same manner as in the output signal of the conventional quadrature modulator.

$$I(t)\cos\omega t + \left(\dfrac{-I(t)}{2} - \dfrac{\sqrt{3}\,Q(t)}{2}\right)\left(\cos\omega t \cos\dfrac{2}{3}\pi - \sin\omega t \sin\dfrac{2}{3}\pi\right) + \\ \left(\dfrac{-I(t)}{2} - \dfrac{\sqrt{3}\,Q(t)}{2}\right)\left(\cos\omega t \cos\dfrac{2}{3}\pi + \sin\omega t \sin\dfrac{2}{3}\pi\right) = \\ 1.5I(t)\cos\omega t + 1.5Q(t)\sin\omega t \quad (10)$$

In a case where the vector multiplier of FIG. 8 is combined with the three-phase polyphase filter shown in FIG. 4, or the three-phase local signal generator using the three-frequency divider shown in FIG. 5, the vector multiplier of FIG. 8 can handle a local signal which is either a single end signal or a differential signal.

In the conventional quadrature modulator, there are used multipliers for an I-channel and a Q-channel, respectively. On the other hand, since the vector multiplier of the present embodiment has three modulation input terminals 61, 62, and 63 and three local input terminals 64, 65, and 66, both the amplitude and the phase can be modulated by a single multiplier. Therefore, in the vector multiplier of the present embodiment, an occupying area on a semiconductor chip is reduced, and a demodulator can be realized all the more inexpensively.

Furthermore, in the vector multiplier of the present embodiment, there are fewer error factors such as a difference between a I-signal gain and a Q-signal gain as compared with a case where the multipliers are used for the I-channel and the Q-channel, respectively. Therefore, a modulation precision is easily secured.

FIFTH EMBODIMENT

Figure 9:
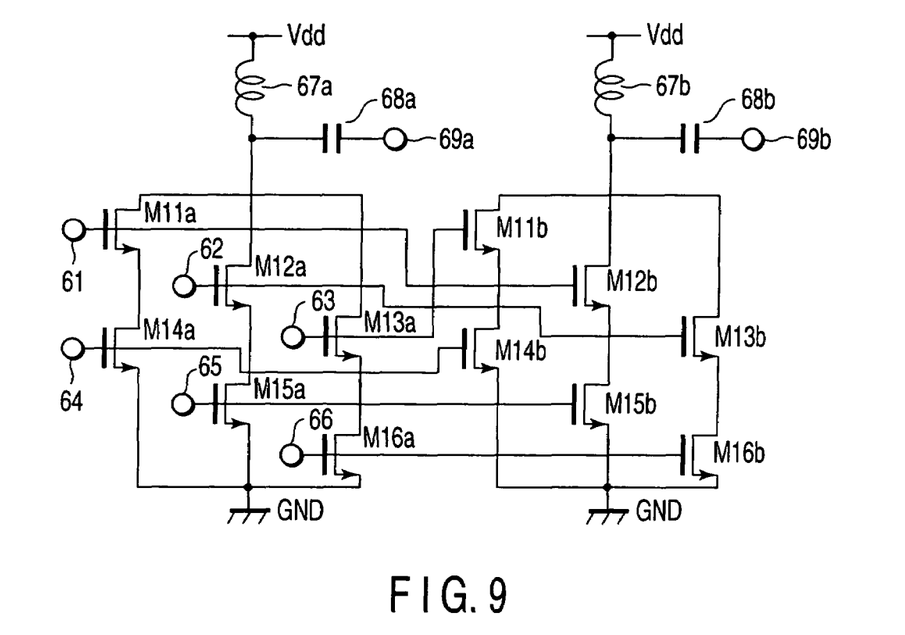
FIG. 9 is a circuit diagram of a vector multiplier in a fifth embodiment of the present invention.

FIG. 9 shows a vector multiplier in a fifth embodiment of the present invention. FIG. 8 shows the vector multiplier of the single end output type, whereas the vector multiplier of FIG. 9 is of a differential output type. Therefore, a multiplication unit in the present embodiment includes a first multiplication unit to obtain a multiplied output signal having a first polarity, and a second multiplication unit to obtain a multiplied output signal having a second polarity.

The first and second multiplication units are similar to the multiplication unit shown in FIG. 8. That is, the first multiplication unit has: NMOS transistors M11a, M12a, M13a, M14a, M15a, and M16a; and an inductor 67a and a capacitor 68a forming a load circuit. The second multiplication unit has: NMOS transistors M11b, M12b, M13b, M14b, M15b, and M16b; and an inductor 67b and a capacitor 68b forming a load circuit. An output terminal 69a is connected to a connection point between drain terminals of the transistors M14a, M15a, and M16a and the load circuit of the inductor 67a and the capacitor 68a, and an output terminal 69b is connected to a connection point between drain terminals of the transistors M14b, M15b, and M16b and the load circuit of the inductor 67b and the capacitor 68b.

A modulation input terminal 61 is connected to gate terminals of the transistors M11a and M12b, a modulation input terminal 62 is connected to gate terminals of the transistors M12a and M13b, and a modulation input terminal 63 is connected to gate terminals of the transistors M13a and M11b. A local input terminal 64 is connected to gate terminals of the transistors M14a and M14b, a local input terminal 65 is connected to gate terminals of the transistors M15a and M15b, and a local input terminal 66 is connected to gate terminals of the transistors M16a and M16b.

In this manner, each of the first and second multiplication units multiplies modulating signals input to the modulation input terminals 61, 62, and 63 by three-phase local signals input to the LO input terminals 64, 65, and 66, but a combination of the modulating signal and the local signal as multiplication objects differs with the first and second multiplication units.

According to such constitution, the vector multiplier of FIG. 9 extracts a difference component between two signals among three input modulating signals as a high-frequency differential signal from the output terminals 69a and 69b, whereas the vector multiplier of FIG. 8 selectively outputs one of three input modulating signals to the load circuit in accordance with the three-phase local signals.

As an input system of a subsequent-stage circuit to receive an output signal of the modulator, there are considered a single end input and a differential input. The vector multiplier of FIG. 8 is suitable for a case where the subsequent-stage circuit has the single end input, and the vector multiplier of FIG. 9 is suitable for the circuit having the single end input. The modulator of FIG. 9 can be combined with the polyphase filter shown in FIG. 4 or the frequency divider shown in FIG. 5 to realize a modulator even in a case where the three-phase local signals are differential signals in the same manner as in the modulator of FIG. 8.

SIXTH EMBODIMENT

Figure 10:
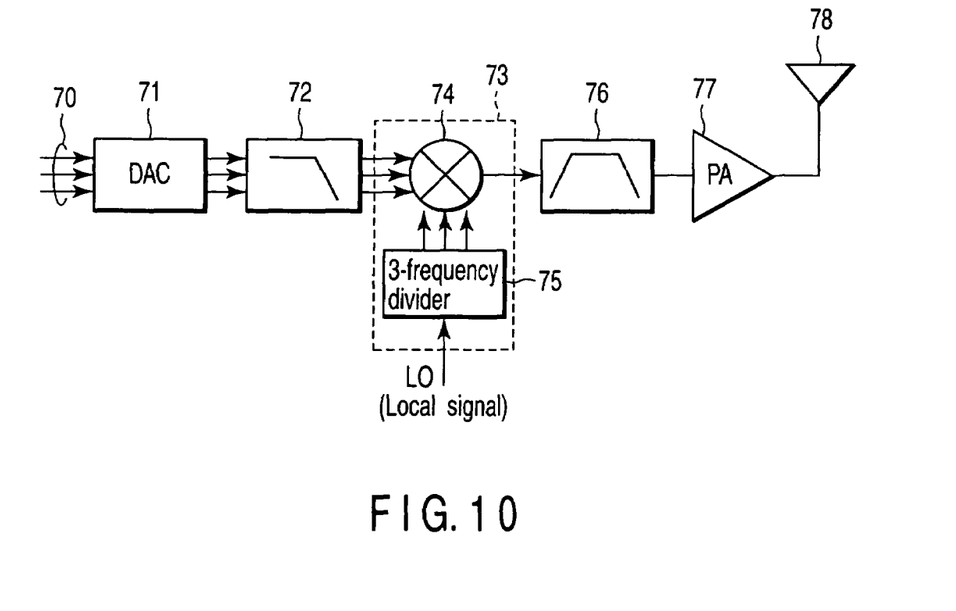
FIG. 10 is a block diagram of a transmission side (radio transmitter) of a radio communication apparatus in a sixth embodiment of the present invention.

FIG. 10 is a block diagram of a transmission side of a radio communication apparatus in a sixth embodiment of the present invention, that is, a radio transmitter. The transmitter includes a modulator realized using a vector multiplier shown in FIG. 8 or 9. Input three-phase digital modulating signals 70 are converted into analog signals (analog modulating signals) by a digital-to-analog converter 71, respectively. After high-pass-side undesired signal components are removed from the analog modulating signals output from the digital-to-analog converter 71 by a baseband filter 72 (e.g., low-pass filter), the signals are input to a modulator 73.

The modulator 73 has a vector multiplier 74 shown in FIG. 8 or 9 and a three-frequency divider 75 shown in FIG. 5. The three-frequency divider 75 converts reference local signals into three-phase local signals which are three square-wave signals having a phase difference of 120° to supply the signals to the vector multiplier 74. The vector multiplier 74 performs complex multiplication of multiplying the three-phase analog modulating signals from the baseband filter 72 by the three-phase local signals from the three-frequency divider 75, and outputs a quadrature-modulated signal. A higher harmonic wave component is removed from the modulated signal output from the modulator 73 by a high-frequency filter (e.g., a band-pass filter) 76. After an output signal of the high-frequency filter 76 is amplified to a necessary power by a power amplifier 77, the signal is supplied to an antenna 78. Accordingly, the antenna 78 transmits an RF signal.

Since the modulator 73 uses the vector multiplier 74, the number of circuit elements is small, and a high modulation precision can be easily obtained as compared with a case where a conventional quadrature modulator is used. Furthermore, in the conventional quadrature modulator, when both an I-signal and a Q-signal are differential signals, four-phase signals are required. On the other hand, since the vector multiplier 74 utilizes three-phase signals, especially the circuit elements of the front-stage baseband filter 72 can be reduced, and the circuit can be inexpensively realized.

SEVENTH EMBODIMENT

Figure 11:
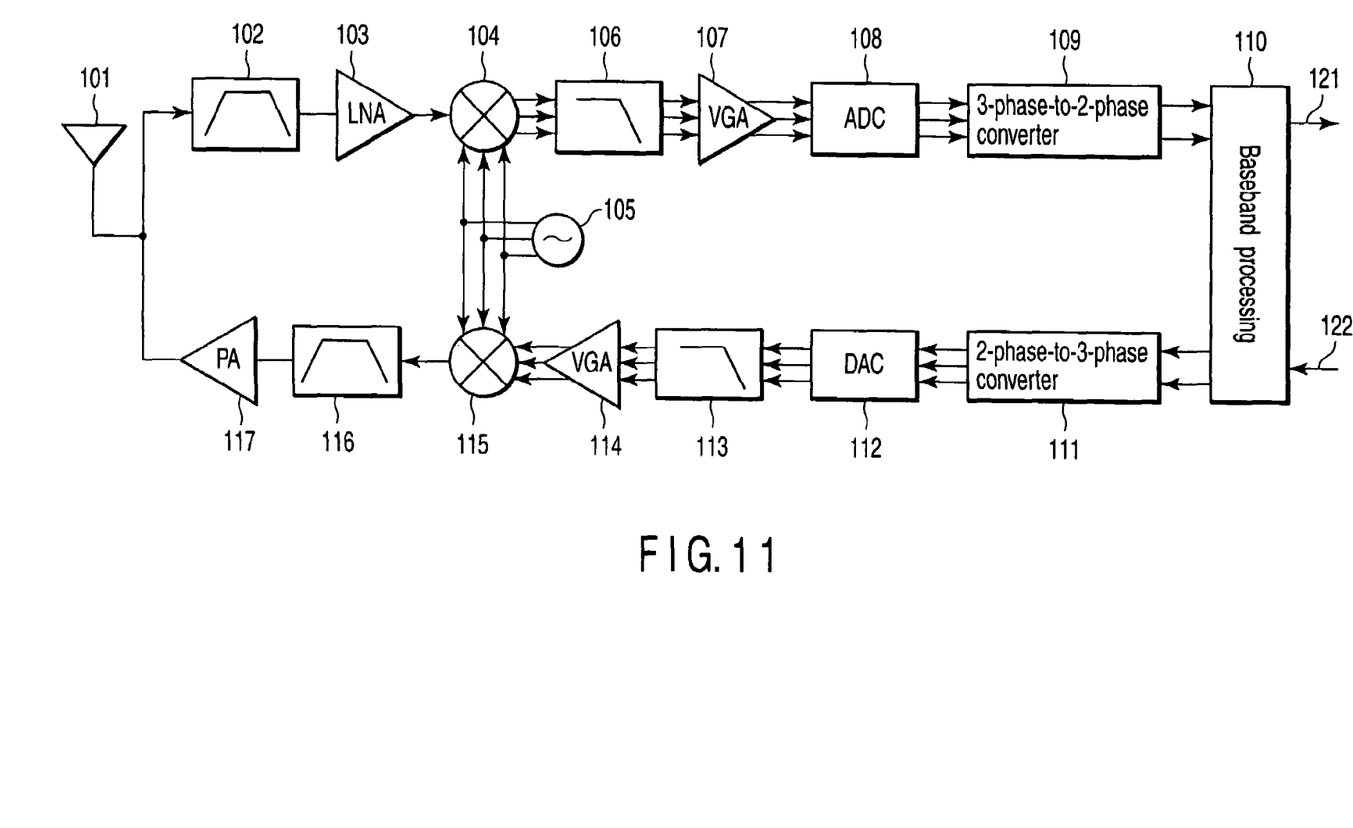
FIG. 11 is a block diagram of a radio communication apparatus (radio transmitter/receiver) in a seventh embodiment of the present invention.

FIG. 11 is a block diagram of a radio communication apparatus (radio transmitter/receiver) in a seventh embodiment of the present invention. The apparatus includes a demodulator and a modulator using vector multipliers, respectively. A reception side will be described. A reception signal obtained by receiving an RF signal by an antenna 101 is input to a low-noise amplifier 103, after a high-frequency filter 102 (e.g., a band-pass filter) roughly selects a channel.

An output signal of the low-noise amplifier 103 is input to a vector multiplier 104 shown in FIG. 1 or 3. Three-phase local signals are supplied from a three-phase local signal generator 105 to the vector multiplier 104. The vector multiplier 104 and the three-phase local signal generator 105 constitute a demodulator, and three-phase baseband signals around a direct current appear as outputs from the vector multiplier 104.

A necessary frequency component is selectively extracted from the output signal of the vector multiplier 104 by a baseband filter 106 (e.g., a low-pass filter) in the same manner as in a usual direct conversion receiver. After output signals of the baseband filter 106 are amplified into signals having amplitude suitable for analog-to-digital conversion by a variable gain amplifier 107, the signals are input to an analog-to-digital converter 108. The analog-to-digital converter 108 outputs three-phase digital baseband signals.

The three-phase digital baseband signals are converted into two-phase signals, that is, usual I and Q two-phase digital baseband signals by a three-phase to two-phase converter 109. The three-phase to two-phase converter 109 converts input three-phase digital baseband signals $v_{10}$, $v_{11}$, and $v_{12}$ into two-phase digital baseband signals $I_1$ and $Q_1$ represented by Equation (11).

$$\begin{pmatrix} I_1 \\ Q_1 \end{pmatrix} = \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} v_{10} \\ v_{11} \\ v_{12} \end{bmatrix} \quad (11)$$

The two-phase digital baseband signals are sent to a baseband processing unit 110. The baseband processing unit 110 decodes the two-phase digital baseband signals to obtain reception data 121.

Next, a transmission side will be described. The baseband processing unit 110 inputs I and Q two-phase digital baseband signals generated in accordance with transmission data 122. The two-phase digital baseband signals are converted into three-phase digital baseband signals by a two-phase to three-phase converter 111. The two-phase to three-phase converter 111 converts the input two-phase digital baseband signals $I_2$ and $Q_2$ into three-phase digital baseband signals $v_{20}$, $v_{21}$, and $v_{22}$ represented by, for example, Equation (12).

$$\begin{bmatrix} v_{20} \\ v_{21} \\ v_{22} \end{bmatrix} = \begin{bmatrix} 1 & 0 \\ -\dfrac{1}{2} & \dfrac{\sqrt{3}}{2} \\ -\dfrac{1}{2} & -\dfrac{\sqrt{3}}{2} \end{bmatrix} \begin{pmatrix} I_2 \\ Q_2 \end{pmatrix} \qquad (12)$$

The three-phase digital baseband signals are converted into analog signals (analog modulating signals) by a digital-to-analog converter 112.

After high-pass-side undesired components are removed from the analog modulating signals output from the digital-to-analog converter 112 by a baseband filter 113 (e.g., low-pass filter), the signals are further amplified to appropriate amplitude by a variable gain amplifier 114. Thereafter, the signals are input to a vector multiplier 115 shown in FIG. 8 or 9. The three-phase local signals are supplied from the three-phase local signal generator 105 to the vector multiplier 115. The vector multiplier 115 and the three-phase local signal generator 105 constitute a modulator. The vector multiplier 115 outputs a high-frequency modulated signal.

A higher harmonic wave component is removed from the modulated signal output from the vector multiplier 115 by a high-frequency filter (e.g., a band-pass filter) 116. After an output signal of the high-frequency filter 116 is amplified to a necessary power by a power amplifier 117, the signal is supplied to the antenna 101. Accordingly, the antenna 101 transmits an RF signal.

Figure 12:
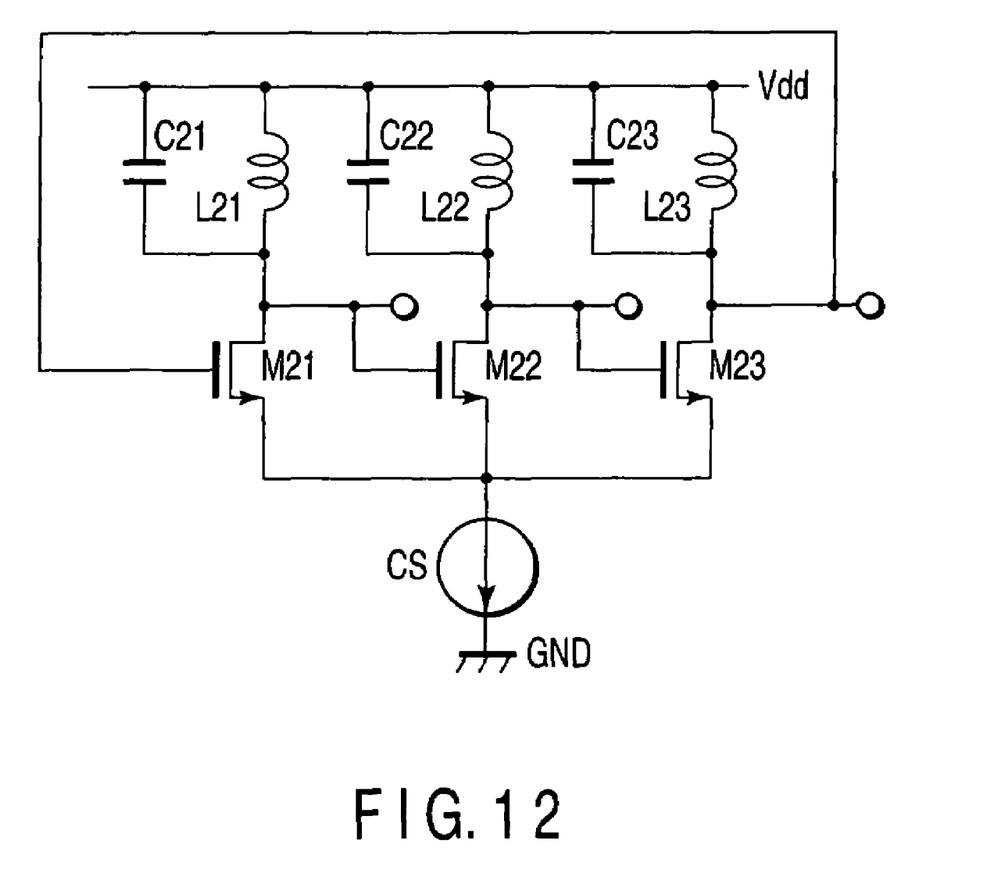
FIG. 12 is a circuit diagram of an example of a three-phase oscillator for use in a three-phase local signal generator shown in FIG. 11.

The three-phase local signal generator 105 may be a polyphase filter shown in FIG. 4 or a three-frequency divider shown in FIG. 5, but a three-phase oscillator shown in, for example, FIG. 12 may be used. In the three-phase oscillator of FIG. 12, NMOS transistors M21, M22, and M23 are cascade-connected to one another, and an output of the transistor M23 of a final-stage is fed back to an input of the transistor M21 of an initial-stage. A current source CS is connected to a common source terminal of the transistors M21, M22, and M23.

Drain terminals of the transistors M21, M22, and M23 are connected to a load circuit including an inductor L21 and a capacitor C21, a load circuit including an inductor L22 and a capacitor C22, and a load circuit including an inductor L23 and a capacitor C23, respectively. Three-phase local signals are output from the drain terminals of the transistors M21, M22, and M23.

When a voltage-controlled oscillator (VCO) is prepared using the three-phase oscillator of FIG. 12, and an oscillation frequency of the VCO is controlled by a phase-locked loop (PLL) in the same manner as in a usual single-phase oscillator, it is possible to obtain three-phase local signals having a more precise frequency.

When the vector multipliers are used in the demodulator on the transmission side and the modulator on the reception side in this manner, the number of the circuit elements can be reduced, and a radio communication apparatus having an equivalent function can be provided at lower cost as compared with a conventional radio communication apparatus including the quadrature modulator and the quadrature demodulator each having two multipliers. Furthermore, when the three-phase oscillator is used in the three-phase local signal generator, the frequency divider and the like are not required, and further miniaturization and cost reduction can be achieved.

The vector multiplier for use in the radio communication apparatus has been described above, but the vector multiplier of the embodiment of the present invention is applicable to not only radio communication but also the cable communication field or another application to perform demodulation, modulation, or frequency conversion in another analog signal processing field.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multiplier comprising:
    a first input terminal which receives a modulated signal;
    three second input terminals which receive first, second, and third local signals respectively, the first, second, and third local signals having a phase difference of 120° from one another;
    a multiplication unit configured to multiply the modulated signal by each of the first, second, and third local signals, and output first, second, and third multiplied output signals; and
    three output terminals from which the first, second, and third multiplied output signals are derived, respectively.

2. The multiplier according to claim 1, wherein the multiplication unit includes:
    a first transistor controlled by the modulated signal;
    three second transistors cascade-connected to the first transistor and controlled by the first, second, and third local signals, respectively; and
    three loads connected to the second transistors, respectively, and wherein
    the three output terminals are connected to connection points between the second transistors and the loads, respectively.

3. The multiplier according to claim 1, further comprising a local signal generator including a polyphase filter which receives a reference local signal to generate the first, second, and third local signals.

4. The multiplier according to claim 1, further comprising a local signal generator including a first latching circuit and a second latching circuit each configured to cyclically transit three stable states every cycle of an input reference clock signal for generating the first, second, and third local signals.

5. A radio communication apparatus comprising:
    a reception unit configured to receive a modulated signal;
    a demodulator including the multiplier according to claim 1, and a local signal generator which generates first, second, and third local signals and configured to output a baseband signal obtained by demodulating the modulated signal from the multiplier; and
    a decoding unit which decodes the baseband signal.

6. A multiplier comprising:
    a first input terminal which receives a modulated signal of a differential component between a first polarity signal and a second polarity signal;
    three second input terminals which receive first, second, and third local signals respectively, the first, second, and third local signals having a phase difference of 120° from one another;
    a multiplication unit configured to multiply the first polarity signal by each of the first, second, and third local signals and to multiply the second polarity signal by each of the first, second, and third local signals in order to produce first, second, and third multiplied output signals; and three output terminals from which the first, second, and third multiplied output signals are derived, respectively.

7. The multiplier according to claim 6, wherein the multiplication unit includes:
a first transistor controlled by the first polarity signal;
a second transistor controlled by the second polarity signal;
three third transistors cascade-connected to the first transistor and controlled by each of the first, second, and third local signals;
three fourth transistors cascade-connected to the second transistor and controlled by each of the first, second, and third local signals; and
three loads connected in common to the third transistors and the fourth transistors, and wherein
the three output terminals are connected to connection points between the third and fourth transistors and the load, respectively.

8. The multiplier according to claim 6, further comprising:
a local signal generator including a polyphase filter which receives a reference local signal to generate the first, second, and third local signals.

9. The multiplier according to claim 6, further comprising:
a local signal generator including a first tri-stable latching circuit and a second tri-stable latching circuit each having three stable states and configured to cyclically transfer the stable states every cycle of an input reference clock signal for generating the first, second, and third local signals.

10. A radio communication apparatus comprising:
a reception unit configured to receive a modulated signal;
a demodulator including the multiplier according to claim 6, and a local signal generator which generates first, second, and third local signals, and demodulating the modulated signal from the multiplier to output a baseband signal; and
a decoding unit which decodes the baseband signal.

11. A multiplier comprising:
three first input terminals which receive first, second, and third modulating signals, respectively;
three second input terminals which receive first, second, and third local signals respectively, the first, second, and third local signals having a phase difference of 120° one another;
at least one multiplication unit configured to multiply the first, second, and third modulating signals by the first, second, and third local signals respectively for producing at least one multiplied output signal; and
at least one output terminal from which the multiplied output signal is derived.

12. The multiplier according to claim 11, wherein the multiplication unit includes:
three first transistors controlled by the first, second, and third modulating signals, respectively;
three second transistors cascade-connected to the first transistors and controlled by the first, second, and third local signals, respectively; and
a load connected in common to the first transistors, and wherein
the output terminal is connected to a common connection point between the first transistors and the load.

13. The multiplier according to claim 11, wherein the multiplication unit includes a first multiplication unit configured to produce a first multiplied output signal having a first polarity, and a second multiplication unit configured to produce a second multiplied output signal having a second polarity, and the output terminal includes a first output terminal from which the first multiplied output signal is derived and a second output terminal from which the second multiplied output signal is derived.

14. The multiplier according to claim 11, wherein each of the first and second multiplication units includes:
three first transistors controlled by the first, second, and third modulating signals, respectively;
three second transistors cascade-connected to the first transistors and controlled by the first, second, and third local signals, respectively; and
a load connected in common to the first transistors, and wherein
the first output terminal is connected to a common connection point between the first transistors of each of the first and second multiplication units and the load.

15. The multiplier according to claim 11, further comprising:
a local signal generator including a polyphase filter which receives a reference local signal to generate the first, second, and third local signals.

16. The multiplier according to claim 11, further comprising:
a local signal generator including a first latching circuit and a second latching circuit each configured to cyclically transit three stable states every cycle of an input reference clock signal for generating the first, second, and third local signals.

17. A radio communication apparatus comprising:
a generator which generates a modulating signal;
a modulator including the multiplier according to claim 11, and a local signal generator which generates first, second, and third local signals and modulating the modulating signal from the multiplier to output a modulated signal; and
a transmitting unit which transmits the modulated signal.

* * * * *